May 18, 1926.

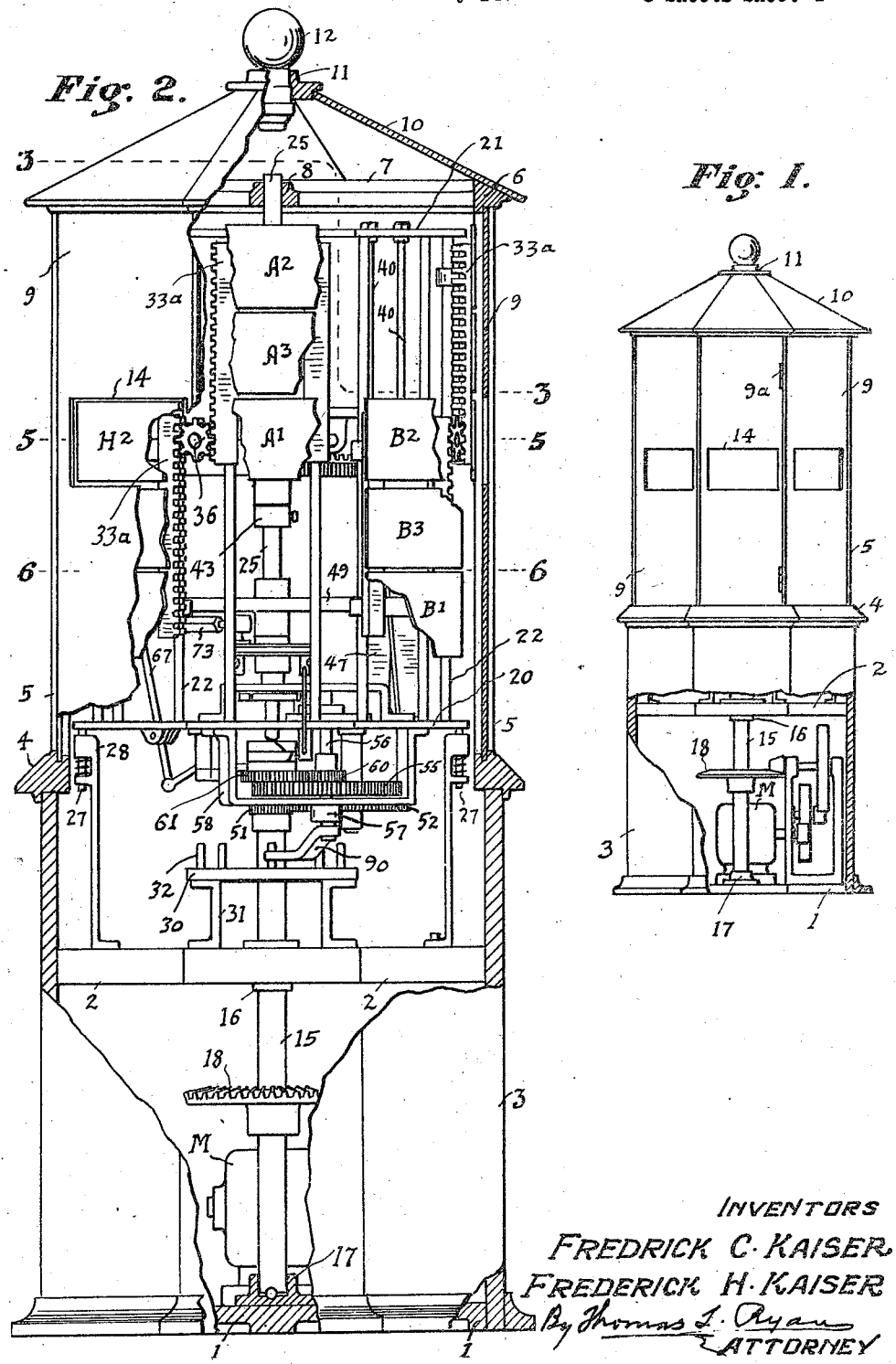

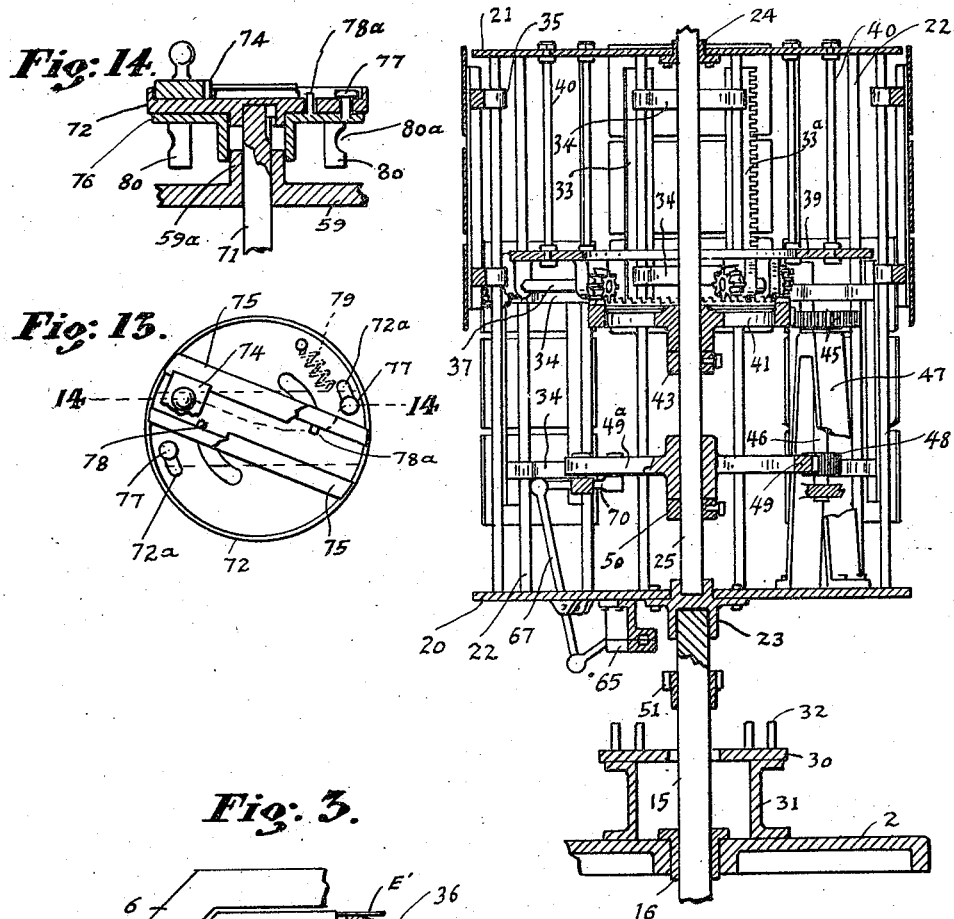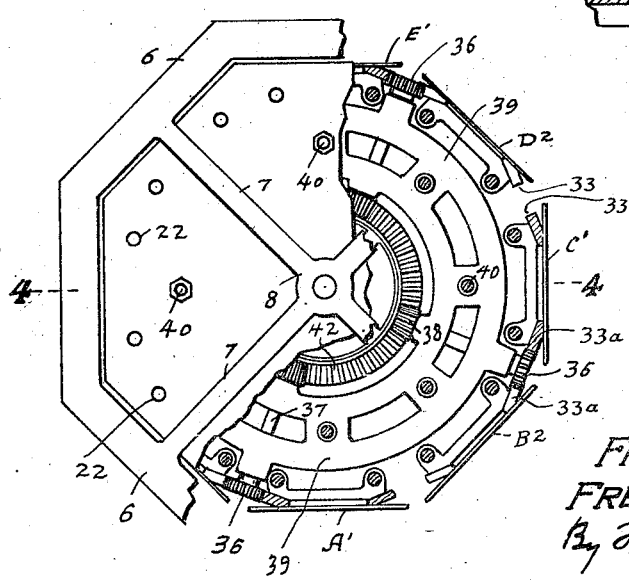

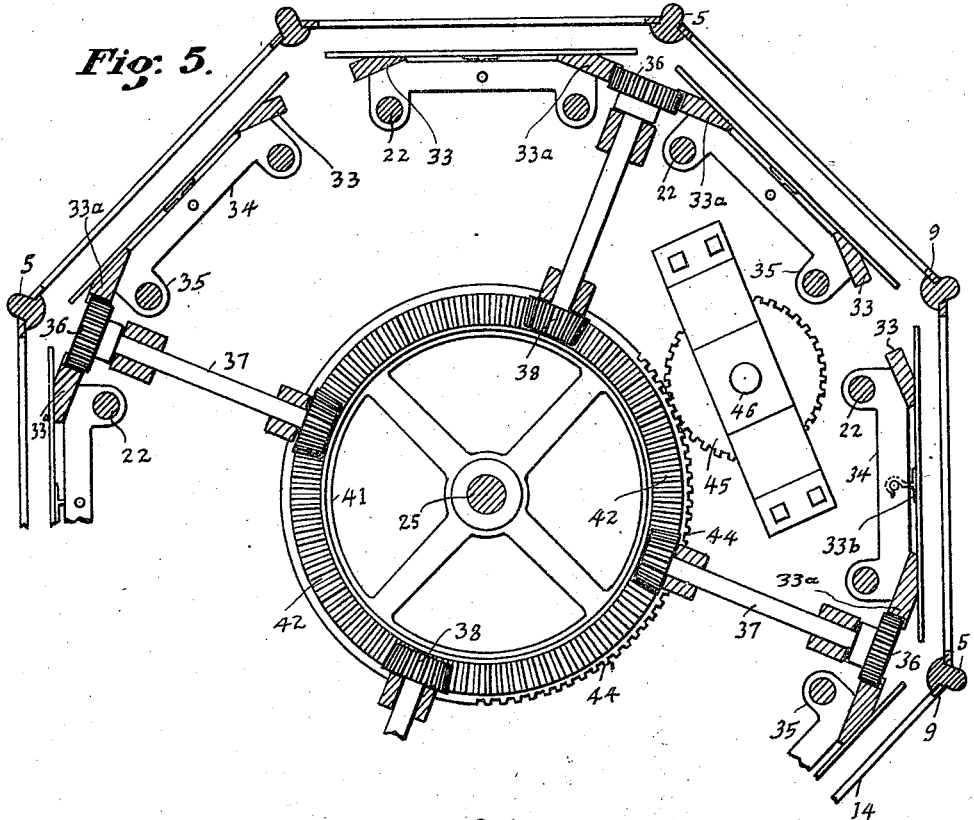
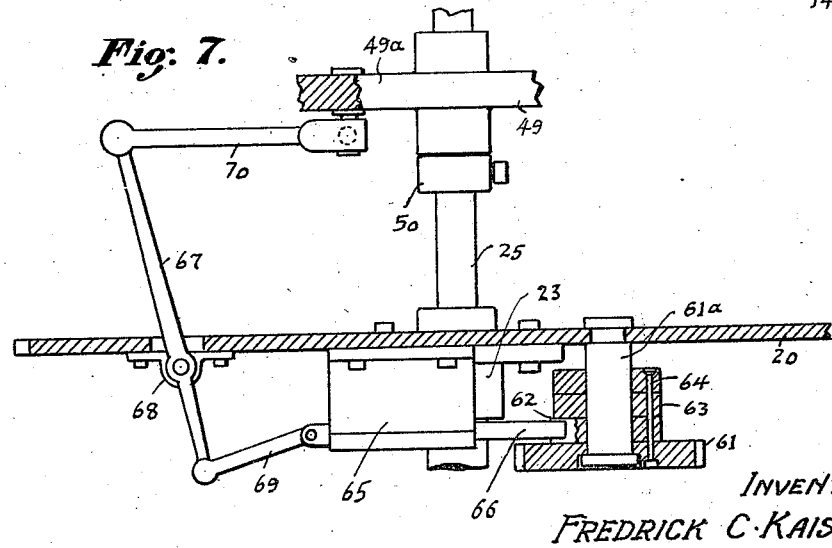

F. C. KAISER ET AL

DISPLAY DEVICE

Filed May 14, 1924  8 Sheets-Sheet 4

1,584,777

INVENTORS
FREDRICK C. KAISER
FREDERICK H. KAISER
By Thomas L. Ryan
ATTORNEY.

May 18, 1926. 1,584,777
F. C. KAISER ET AL
DISPLAY DEVICE
Filed May 14, 1924  8 Sheets-Sheet 5
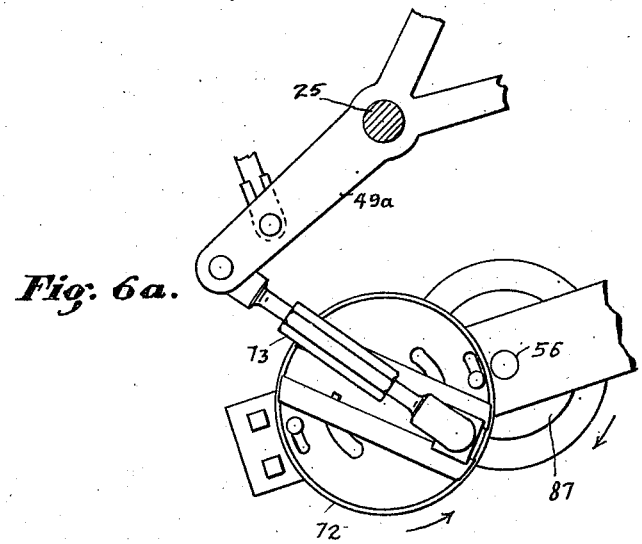
Fig. 6a.
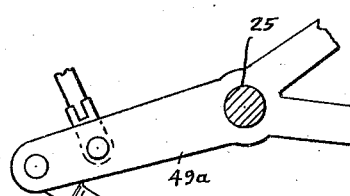
Fig. 6b.
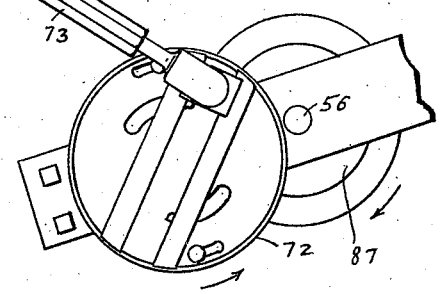
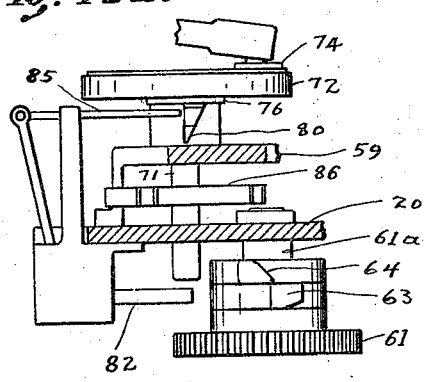
Fig. 12a.
INVENTORS
FREDRICK C. KAISER
FREDERICK H. KAISER
By Thomas L. Ryan
ATTORNEY.

May 18, 1926.  1,584,777

F. C. KAISER ET AL

DISPLAY DEVICE

Filed May 14, 1924  8 Sheets-Sheet 7

INVENTORS
FREDRICK C. KAISER
FREDERICK H. KAISER
By Thomas L. Ryan
ATTORNEY.

May 18, 1926.
F. C. KAISER ET AL
1,584,777
DISPLAY DEVICE
Filed May 14, 1924     8 Sheets-Sheet 8
Fig. 15.
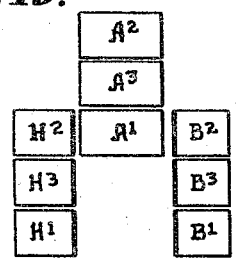
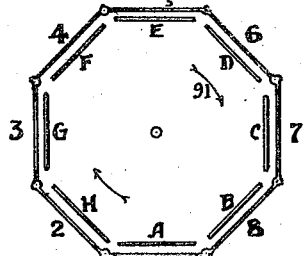
Fig. 16
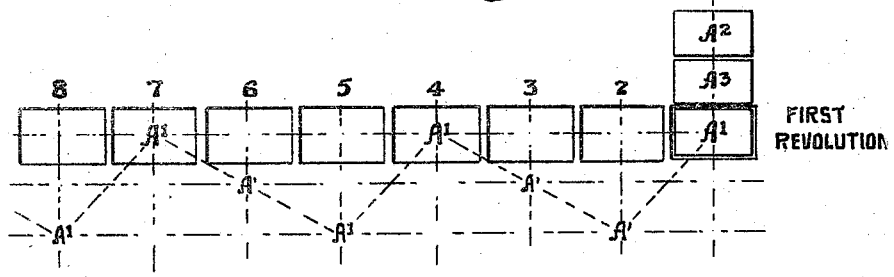
FIRST REVOLUTION
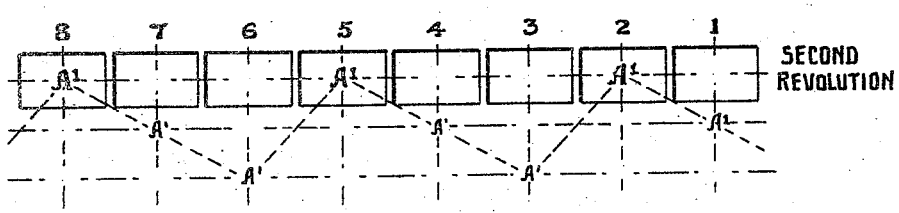
SECOND REVOLUTION
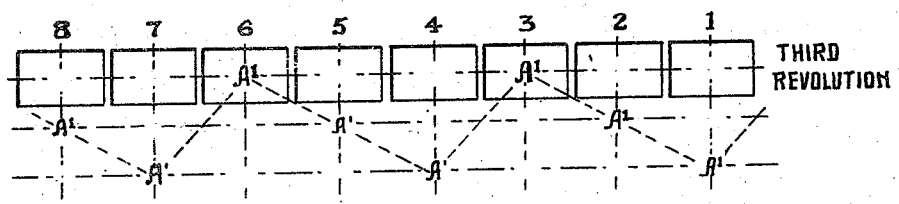
THIRD REVOLUTION
*INVENTORS*
FREDRICK C. KAISER
FREDERICK H. KAISER
By Thomas L. Ryan
ATTORNEY.

Patented May 18, 1926.

1,584,777

UNITED STATES PATENT OFFICE.

FREDRICK C. KAISER AND FREDERICK H. KAISER, OF MUNCIE, INDIANA.

DISPLAY DEVICE.

Application filed May 14, 1924. Serial No. 713,166.

This invention relates to mechanical display devices, and has for its object to provide means for carrying a comparatively large number of display cards or plates, and for so effecting the change from one to the other in the displaying thereof, that within a given time, each one of the total number of cards carried, is caused to appear at each one of several windows or display openings.

Our invention, in the form and arrangement, as shown in the present specification is adapted to display the cards at windows arranged at locations spaced from a common center so that the cards are presented to the view of observers approaching from any direction. The cabinet may be of circular or polygonal form, and of any desired fanciful design.

The mechanism for carrying our invention into effect, consists of the new construction, combination and arrangement of parts described in the following specification, and illustrated in the accompanying drawings. The invention is defined in the appended claims. The several parts of the invention are identified by suitable characters of reference applied thereto, in the different views, in which—

Figure 1 is an exterior view of cabinet of octagonal form and within which the displaying mechanism is contained. The lower portion of the cabinet is partially broken away to permit a view of the driving mechanism.

Figure 2 is an enlarged front view of the invention, the main portion of the cabinet structure being broken away and the driving mechanism being not shown.

Figure 3 is a top plan view taken on the line 3—3 in Figure 2, the roof having been removed.

Figure 4 is a central vertical sectional view taken on the line 4—4 in Figure 3.

Figure 5 is an enlarged sectional segmental top plan view taken on the line 5—5 in Figure 2.

Figure 6:
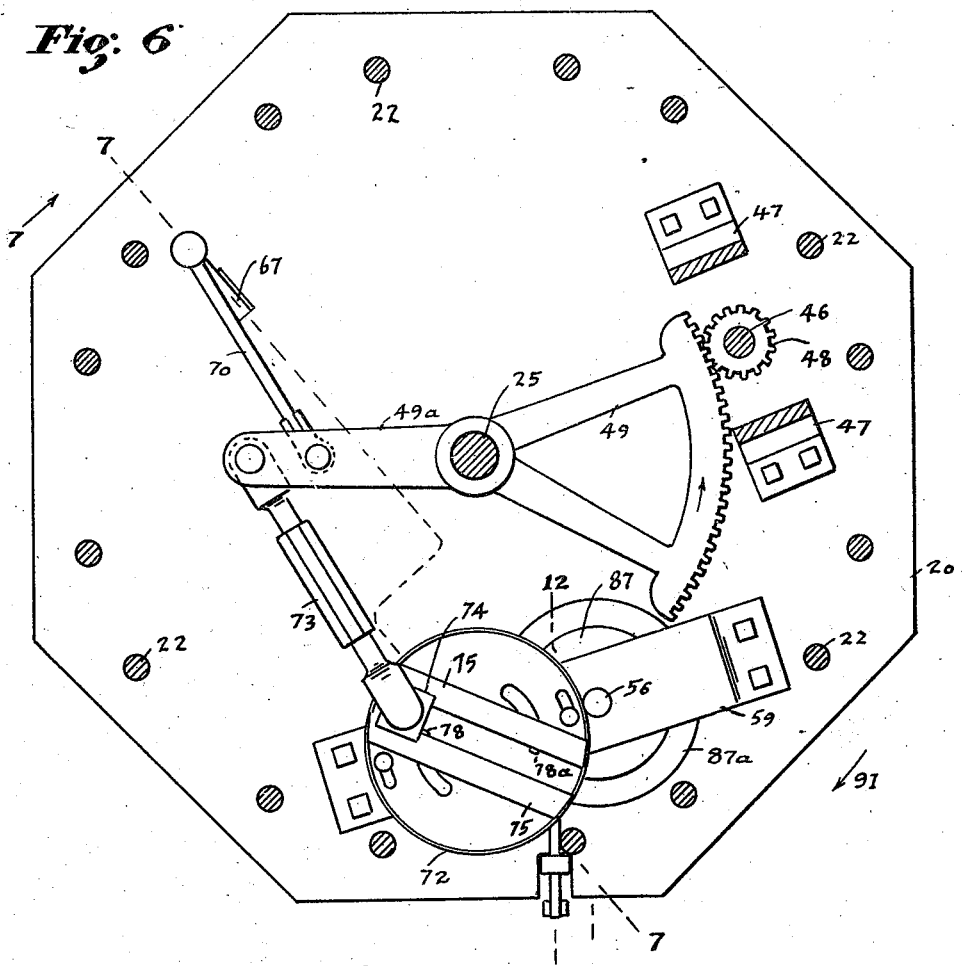
Figure 6 is an enlarged sectional top plan view taken on the line 6—6 in Figure 2.

Figure 6$^a$ is a top plan view showing the cross-head 74 slid over to the side of crank wheel 72 opposite to the position shown in Figure 6.

Figure 6$^b$ is a top plan view showing the crank wheel 72 rotated through an angle of 90 degrees.

Figure 7 is a vertical sectional view taken on the line 7—7, and as seen in direction of the arrow 7 in Figure 6.

Figure 8:
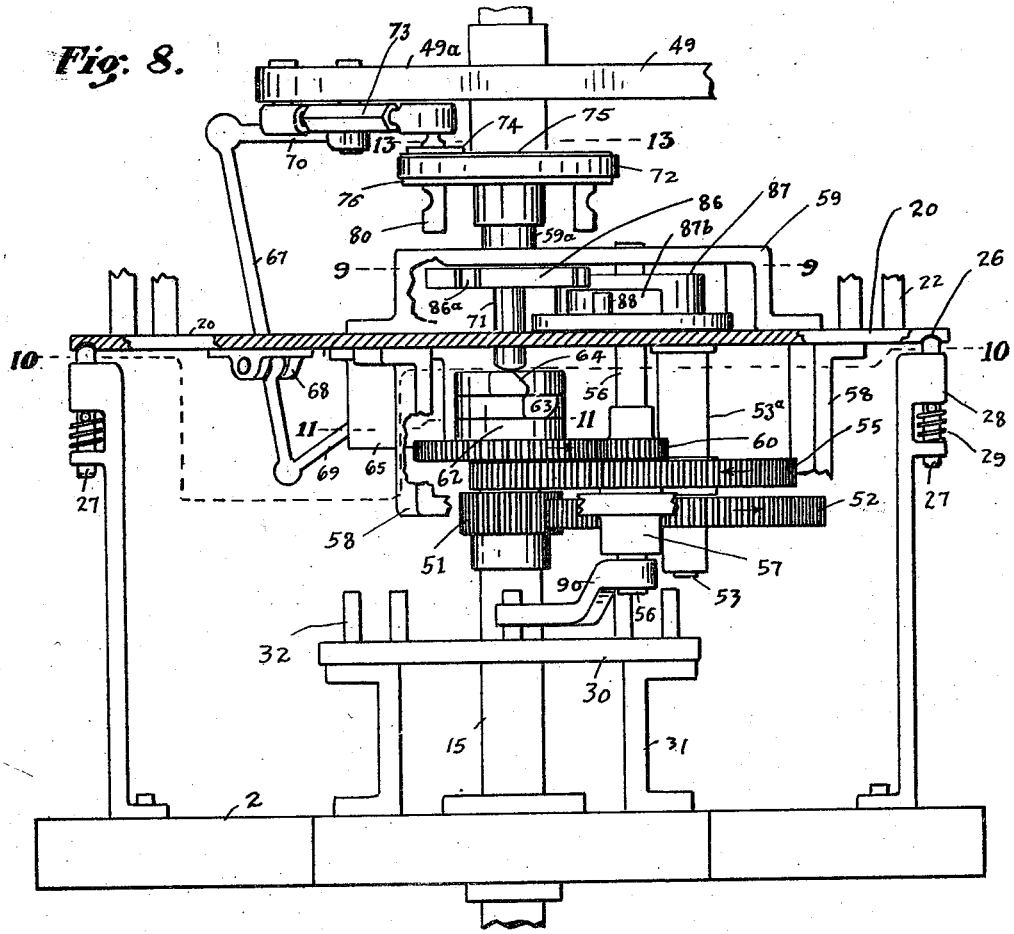

Figure 8 is an enlarged front view of the operating mechanism.

Figure 9:
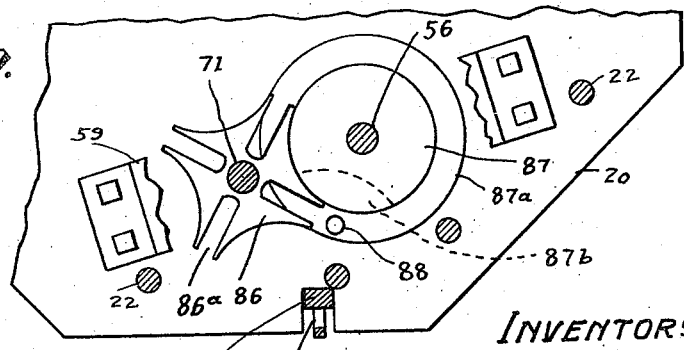

Figure 9 is a sectional top plan view taken on the line 9—9 in Figure 8.

Figure 10:
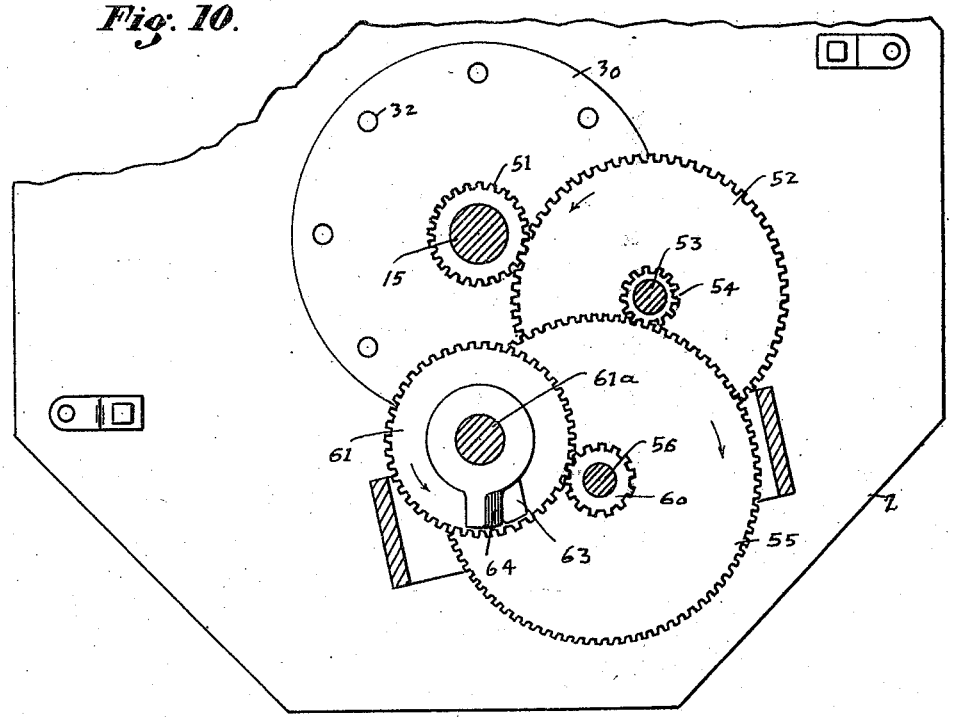

Figure 10 is a sectional top plan view taken on the line 10—10 in Figure 8.

Figure 11:
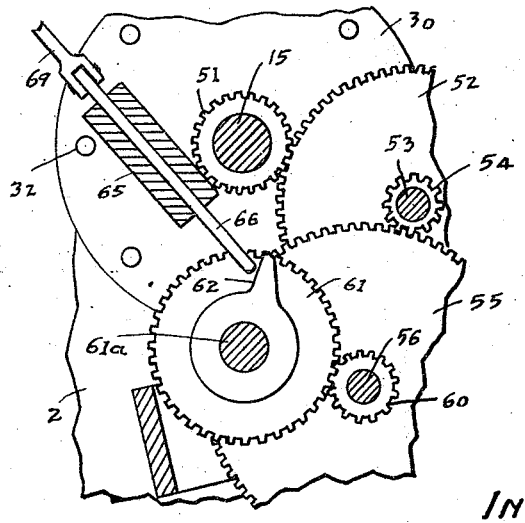

Figure 11 is a sectional top plan view taken on the line 11—11 in Figure 8.

Figure 12:
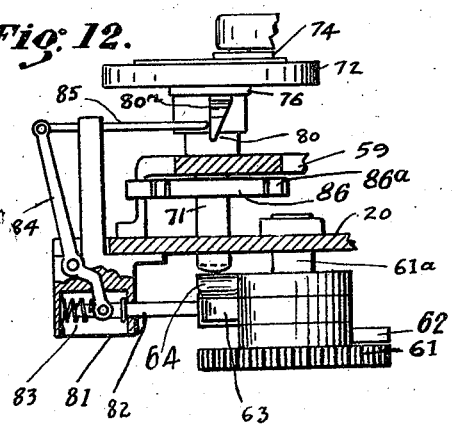

Figure 12 is a vertical sectional view taken on the line 12—12, and seen in the direction indicated by the arrow 12 in Figure 6.

Figure 12$^a$ is a view similar to Figure 12, the latter view however showing the crank wheel 72 lowered.

Figure 13 is a top plan view of the crank wheel 72, taken on the line 13—13 in Figure 8.

Figure 14 is a central vertical sectional view taken on the line 14—14 in Figure 13.

Figure 15 is a diagrammatic front view showing the relative positions of the racks and the cards thereon.

Figure 16 is a diagrammatic view showing the eight windows arranged as on a plane, and dotted lines to indicate the line traversed by the display card, during three complete rotations of the carrier, and in which the one card (for example the card A$^1$) is caused to appear in each of the eight windows.

The frame consists of the octagon shaped, cast metal transverse members 1 and 2 connected by upright pieces 3. These upright pieces 3 may be made of wood and their tops are secured and retained by a moulding piece 4, which supplies a finish and also constitutes a support for the verticals 5. The tops of these verticals are secured to a frame member 6 whose radial struts 7 support a central boss 8. Between the verticals 5, are secured panels 9 which may be made of sheets of metal, or wood, or composition. The roof structure 10 may be provided with a fitting 11 in which is retained an ornament. This ornament may consist of an electric socket in which an electric lamp 12 may be operated. In each of the casement panels 9, is provided a window or opening 14 which may be of the rectangular form as shown. It is at these windows that the plates or planes upon which are borne the subject matter to be presented to the viewer, are presented. These plates hereinafter designated as cards, may be a standard size of about twelve inches high, and twenty-one inches in length.

In the present machine, the combination and arrangement of parts and the equipment thereof is such that in the operating of the machine, each one of the total of twenty-four cards carried, is caused to appear and to dwell at each one of the different eight openings, a predetermined length of time. The aforesaid result is accomplished by the new and peculiar, construction and arrangement of mechanical parts now to be described.

Driving shaft 15 is journaled in boxings 16 and 17 of the frame members 2 and 1 respectively. Power to impart continuous rotation of this shaft may consist of an electric motor M geared to a gear wheel 18 that is secured to the said shaft.

At a position above the several parts just described a carrier is mounted for rotative movement and upon which carrier a number of racks or holders for the cards are carried. The carrier is adapted to be shifted at each actuation, in a rotative direction, one eighth of a revolution, or the distance between the windows. The card racks are adapted for movement vertically and are actuated to move through a certain distance, and at certain moments with regard to the action of the carrier, as will be presently described.

The said carrier consists of a pair of metal plates 20 and 21 supported at spaced distance apart by upright members 22. These members 22 consist of smoothly finished metal bars or rods which not only constitute frame members of the carrier but also perform the function of guide bars for the vertically movable card racks presently to be referred to.

Centrally of the plate 20 is a bearing block 23 which is supported and journaled on the top of the shaft 15. 24 designates a journal bearing secured centrally of the plate 21. A shaft 25 has its bottom end journaled in the block 23, and its upper portion is journaled in the block 24. The shaft 25 is maintained at the vertical central position as shown, by having its upper end retained in the boss 8 of the cabinet frame.

By the foregoing description it will be observed that the carrier is retained at vertical position and at the same time it is free to be moved rotatively. Near each point of the plate 20 on the lower side is a recess 26. A detent 27 slidingly retained in a bracket 28, and actuated by a spring 29 acts as a latch to engage the carrier at all times at position with its lateral faces at registration alignment with the casement panels 9. On a circular table 30 that is centrally secured on a support 31 at position a suitable distance below the carrier plate 20, are the upwardly projecting spaced studs 32, and whose functions will presently be referred to.

Adapted to be shifted vertically on the said carrier are light frames, which we designate as card racks. Each card rack is similar to the other, and to each rack are attached the display cards that are to be exhibited at the windows 14. Each of these card racks consists of a pair of rack bars 33 and 33ª (the latter being toothed, as shown in Figure 5), connected at spaced distance apart by cross pieces 34. Suitably bored lugs 35 on the back of each cross piece, fit slidingly on the guide bars 22 so that the racks so supported are capable of being moved freely. The card racks with three cards on each, and arranged in four pairs (four pairs at raised and four pairs at lowered position) are supported, and are moved by pinions 36 that mesh with the teeth of rack bars 33ª. Each pinion is secured to a shaft 37 arranged radially, and on its inner end is secured a beveled pinion 38. The shafts 37 are journaled in suitable bearings therefor carried by a frame member 39 which is supported by frame bars 40 connected to the plate 21 of the carrier.

Means operable from the continuously moving drive shaft 15 to cause the movement of each rack one half of its length, and to shift the carrier, then to cause the movement of the rack the last half of its stroke, and to shift the carrier, and then to cause the reverse movement of the rack its entire length or full stroke and to shift the carrier, and to repeat these operative movements, consists of the combination and arrangement of parts as follows:

A gear wheel 41 as shown in Figures 4 and 5 having the circular rack 42 to mesh with the bevel pinions 38, is journaled on the shaft 25, and is supported by a collar 43 that is secured to said shaft. The segmental rack 44 on the said gear wheel 41, meshes with a gear wheel 45 that is secured to a shaft 46. The shaft 46 is journaled in bearings of a frame member 47 that is secured to the carrier plate 20. A smaller pinion 48 which is secured to shaft 46 meshes with a gear sector 49 which has its hub journaled on the shaft 25, and which hub rests loosely on a collar 50. The gear sector 49 is provided with an arm 49ª.

It is apparent that by a movement of the gear sector 49 there is imparted through the gearing just described, such motion to the pinions 36 that there is the movement of the card racks. Secured to the driving shaft 15 as shown in Figures 8 and 10 is a gear pinion 51 which meshes with gear wheel 52 that is secured to a shaft 53 which is supported by a stud 53$^a$ from carrier plate 20. Gear pinion 54 of gear wheel 52 meshes with gear wheel 55 that is secured to vertical shaft 56. The shaft 56 has its lower portion journaled in boxing 57 of support bracket 58, and its upper portion is journaled in suitable boxing therefor in the support member 59.

Gear pinion 60 secured to shaft 56, meshes with gear wheel 61 which is journaled on a stud 61$^a$ which is carried by the said carrier plate 20, as shown plainly in Figure 12. Secured to the gear wheel 61 are cams 62, 63, and 64. The functions performed by these cams are important, and will presently be fully described.

Secured to the underside of carrier plate 20 is a guide way block 65, (see Figure 7) in which is slidingly retained a push rod 66. Power transmitting connections between this push rod, and the arm 49$^a$ of the gear sector 49, consist of a lever 67 fulcrumed on a block 68 carried on the underside of carrier plate 20, and the ends of which lever bar are connected to the push rod, and the gear sector arm 49$^a$, by toggle like connecting rods 69 and 70. It will be observed that the push rod 66 is at alignment to be engaged by the cam 62. The relative positions of these cams 62, 63 and 64 are shown in Figures 7 and 8 and 11, all of which said cams move in unison with the gear wheel 61.

The direction of movement of the several gear wheels is indicated by the arrow marks applied thereto in the drawings at Figures 8 and 10. At a position above the path of the cam 64 a vertical shaft 71 (see Figures 8 and 14) is journaled in suitable boxings therefor in the carrier plate and the frame member 59. Secured to the top portion of this shaft is a crank wheel 72. A connecting rod 73 (see Figure 6) having one end loosely connected by a ball and socket joint to the gear sector arm 49$^a$, has its forward end similarly connected to a cross head 74. This cross head is connected to the said crank wheel in such manner that while it is normally locked at the position shown and at which position it performs the function of a crank, the said cross head is capable of being unlocked from its said position, and of being permitted to move to a similar operative position on the opposite side of the crank wheel.

The said cross head is retained between guide bars 75 (see Figure 13) which are secured to the crank wheel at position diametrically across its face. On the underside of the said crank wheel and in pivotal connection with the boss 59$^a$ is a bar 76 and which is retained at loose engagement with said crank wheel by headed studs 77 which occupy arcuate slots 72$^a$ of the crank wheel. Through a second pair of arcuate slots, protrude the similar studs 78 and 78$^a$ that are carried by the member 76. By a spring 79, the member 76 is urged to the position shown in Figure 13, the studs 78 being at engagement with the inner edges of the guide bars, the cross head 74 thus being locked at its position. Extending downwardly from the member 76 are lugs 80, each of which lugs has a recess 80$^a$.

On the carrier plate 20, at location adjacent to the mechanism just described is a device, capable of being actuated by the cam 63, and by which device the studs 78 are caused to retract from the guide way between the guide bars 75. In a block 81 which is secured to the said carrier plate is slidingly disposed a slide bar 82, and whose end is at a plane to be engaged by the cam 63, and which bar is urged toward said cam by a spring 83. This slide bar has loose connection with the lever 84, and which lever bar has connection with the push bar 85. Push bar 85 is supported at registration on a plane with the lugs 80, when the crank wheel is at the raised position, as shown in Figure 12.

To obtain a positive rotative movement of the shaft 71 at predetermined moments, and to assure the retention of the said shaft against movement between the moments of actuation, we provide the mechanism comprising the star wheel device shown. The star wheel 86 provided with the gateways 86$^a$, as shown in Figures 8 and 9 is secured to the shaft 71, the arcs of which star wheel, register with the peripheral face of the actuator wheel 87. The annular bottom flange 87$^a$ constitutes a support upon which the star wheel rests, and also for the driver stud 88 whose function is to enter the gateway 86$^a$, and to move the star wheel. The recess 87$^b$ in the actuator wheel, to permit the passing of the star wheel nose, is indicated by the dotted lines. The actuator wheel is secured to the shaft 56.

The device operates through one cycle as follows: Assume that the device is in the position shown in Figures 6$^a$ and 12$^a$. The shaft 56 is rotated from the shaft 15 through gears 51, 52, 54 and 55. At the first revolution of the shaft 56, the arm 90 fixed thereon, engages a stud 32 and thereby rotates the carrier one eighth of a revolution in the direction of the arrow in Figure 6. At the same time the driver stud 88 of the actuator wheel 87 engages and rotates the star wheel 86 one fourth of a revolution, rotating the gear sector 49 a half oscillation by means of crank wheel 72 and connecting rod 73, thereby moving the card racks a half stroke, bringing the parts to the position shown in Figure 6$^b$.

At the second revolution of the shaft 56, the arm 90, again engages a stud 32, rotating the carrier another eighth of a revolution and the driver stud 88 turns the star wheel 86 another fourth of a revolution, rotating the gear sector 49 another half oscillation in the same direction, thereby moving the card racks another half stroke in the same direction, bringing the parts to the position shown in Figures 6 and 12.

At the third revolution of the shaft 56, the arm 90 again engages a stud 32, rotating the carrier another eighth of a revolution. At this time the gears 60 and 61 have rotated the cam 64 to a position to raise the star wheel 86 out of the path of the driver stud 88 so that the star wheel is not rotated; the cam 63 by means of a slide bar 82 and lever 84 moves push bar 85 against a lug 80 releasing the cross head 74 from stud 78; cam 62, by means of push rod 66 and lever 67 moves connecting rod 70 and rotates gear sector 49 back a complete oscillation, thereby moving the card racks a full stroke; and connecting rod 73 slides the cross head 74 in guides 75 to the other side of crank 72, where it is locked by stud 78$^a$ returning the parts to the position shown in Figures 6$^a$ and 12$^a$, for the beginning of a new cycle.

Reference may be made to the plan and diagrammatic view at Figure 16 in which the several sides of the octagon shaped cabinet (and through whose windows the display cards carried by the racks, are seen) are marked as stations 1 to 8 both inclusive. The cards (upon which the display material is printed) are marked A, B, C, D, E, F, G and H. Each rack carried three cards. For example, the cards on rack A are marked A$^1$, A$^2$ and A$^3$. In the eight shifts of the carrier, during its first complete revolution, the card will have been presented to view at stations 1, 4, and 7; during the second revolution, at stations 2, 5, and 8; and during the third revolution, at stations 3 and 6; so that the said certain card will have appeared at each of the eight windows. It is obvious that while card A$^1$ is at station 2, the card A$^2$ is at window at station 2; and while card A$^1$ is at station 3, the card A$^3$ is at station 3, and so on, during the action of the carrier.

What is true of the travel of rack A, and the exhibition of its cards at the windows, is also true of each of the racks, so that during three revolutions of the carrier, there is the exhibition one time at each window, of all of the twenty four cards retained on the racks.

The main features of our invention are the shifting in a horizontal plane, about a common center, of tiers of cards, the bottom card of each tier of one group or set, and the top card of each tier of the other group or set of tiers, being at a common altitude, and of making provision that one card only, of each tier, may be visible.

All of the movements and actuations of the several parts of the invention being positive, and through gearing and connections in which there is no lost motion, the operation of the machine is dependable, and is not liable to interruption or derangement. To insure the retention of the carrier at steadied and fixed status when at the location during the pause when the cards are at the windows, the latch detents 27 which engage the recesses 26 on the underside of the lower plate of the carrier, are provided. While this latching device holds the carrier against any possible vibration, it permits the carrier to be readily released when the carrier actuating means become operative.

By our invention, a large volume of display or advertising matter may be handled and exhibited to the vision of observers viewing the cabinet from any direction. The entire machine being compact and close-built, it occupies comparatively little space considering its large capacity for effecting the display of advertising material. Each card is given equal opportunity and advantage in its display or exhibition.

Access to the interior of the cabinet for the purpose of installing the cards on the racks, or for arranging or rearranging the same, or for any purpose, is provided for by hinged connections 9$^a$ of one or more of the panels 9 of the cabinet.

Fastenings for the cards may consist of resilient sheet metal clips 33$^b$ by which the cards are removably fastened to the several rack frames.

While the form and structure and details of the several elements are practical and are considered as the preferred form in their several features, for carrying our invention into effect, it will be understood that same are subject to change and modification within the range of equivalents and of the scope of the invention as defined in the appended claims, and that minor mechanical modifications may be made and practiced, without departing from the spirit of the invention or sacrificing any of its advantages.

What we claim as our invention, and desire to secure by Letters Patent, is—

1. A wall having a range of spaced windows therein, a carrier, card racks movable on the carrier and at a right angle to the windows, means to shift the carrier a distance equivalent to the space between the windows, means to move the card racks, devices to actuate the card rack moving means coincidently with the shift of the carrier, a driver, and power transmitting connections between the driver and the shifting and moving means and the said actuating devices.

2. A displaying mechanism, comprising a wall having a range of spaced windows therein, a carrier, card racks movable on the carrier and at a right angle to the windows, cards spaced on said card racks, means to shift the carrier the space between the windows, means to move the card racks, devices to actuate the said card rack moving means to move the card racks consecutively in one direction, devices to actuate the card rack moving means to move the card racks in reverse direction the distance of the total previous consecutive movements of the racks, and devices to actuate the carrier shifting means with each actuation of the card rack moving means, a driver, and power transmitting connections between the driver, the said moving and shifting means and the said actuating devices.

3. A displaying mechanism, comprising a circular cabinet having a range of spaced windows, a carrier mounted for rotative movement within the cabinet, card racks movable on the carrier at a right angle and adjacent to the windows, cards spaced apart on the said racks, means to shift the carrier a distance center to center of windows, means to move the card racks, devices to actuate the card rack moving means to move the card racks consecutively in one direction, and devices to actuate the card rack moving means to move the card racks in a reverse direction the distance of the total previous consecutive movements, coincidently with the shift of the carrier, a driver, and power transmitting connections between the driver, the said moving and shifting means, and the said actuating devices.

4. A card displaying mechanism, comprising a carrier mounted for rotative movement, card racks movable vertically on the carrier, cards spaced one above the other on the said racks, means to shift the carrier a fractional part of complete rotation, means to move the card racks, devices to actuate the card rack moving means to move the card racks consecutively in one direction, and devices to actuate the card rack moving means in a reverse direction the distance of the total previous consecutive movements simultaneously with the shift of the carrier, a driver, power transmitting connections between the driver, the said rack moving and carrier shifting means and the said actuating devices, and an enclosure casement having windows at registration with the said card racks.

5. A card displaying mechanism, comprising a carrier mounted for rotative movement, a card rack movable vertically on the carrier, a card on said rack, means to shift the carrier a fractional part of complete revolution, means to move the card rack, devices to actuate the card rack moving means to move the card rack consecutively in one direction, and devices to actuate the card rack moving means in a reverse direction the distance of the total previous consecutive movements simultaneously with the shift of the carrier, a driver, power transmitting connections between the driver, the said rack moving and carrier shifting means and the said actuating device, and an enclosure casement having windows at position to permit a view of the card during the interval of time between the moments of the shift of the carrier.

6. A card displaying mechanism, comprising a carrier mounted for rotative movement, card racks movable vertically on the carrier, cards spaced one above the other on the racks, means to shift the carrier a fractional part of complete rotation, latches to hold the carrier during the moments intervening between the shifts of the carrier, means to move the card racks, devices to actuate the card rack moving means to move the card racks consecutively in one direction, and devices to actuate the card rack moving means to move the card racks in a reverse direction the distance of the total previous consecutive movements simultaneously with the shift of the carrier, a driver, power transmitting connections between the driver, the rack moving and carrier shifting means and the said actuating devices, and an enclosure having windows arranged in horizontal alignment to permit a view of the card during the interval of time between the moments of the shifting of the carrier.

7. A displaying device, comprising a vertical sided carrier mounted for rotative movement, an upper tier of cards on opposite sides of the carrier, a lower tier of cards on the opposite sides of the carrier intermediate the said opposite sides occupied by the upper tiers, the bottom card of the upper tier and the top card of the lower tier being at a common altitude, means to shift the carrier a fractional part of a complete rotation, a cabinet to surround the carrier and having spaced windows at the said common altitude, means to move the upper tier downwardly, means to move the lower tier upwardly, a distance center to center of the cards, with consecutive shifts of the carrier, and means operable during predeterminate shifts of the carrier to move the tiers in a direction reverse and through a distance equal to that traveled by the tiers in the total of their previous consecutive movements.

8. A displaying device, comprising a vertical sided carrier, an upper tier of cards on opposite sides of the carrier, a lower tier of cards on the opposite sides of the carrier intermediate the said opposite sides occupied by the upper tiers, the bottom card of the upper tier and the top card of the lower tier being at a common altitude, means to shift the carrier a fractional part of a complete rotation, a cabinet to surround the carrier and having spaced windows at the said common altitude, and means to so move the pairs of tiers, that with each shift of the carrier there will have been a change from one card to the other, of each tier, at each of the said windows.

9. A displaying mechanism, comprising a vertical sided carrier mounted for rotative movement, an upper tier of cards on the opposite sides of the carrier, a lower tier of cards on the opposite sides of the carrier intermediate the opposite sides occupied by the upper tiers, the bottom card of the upper tier and the top card of the lower tier being at a common altitude, means to shift the carrier a fractional part of complete rotation, a shield or cabinet to surround the carrier and having spaced windows at the said common altitude, and means so operable with regard to the carrier, the card tiers, and the shield or cabinet, that coincidently with each shift of the carrier there is the change from one card to the other of each tier at each of the windows.

10. A displaying device, comprising a vertical sided carrier, an upper tier of cards on the opposite sides of the carrier, a lower tier of cards on the opposite sides of the carrier intermediate the opposite sides occupied by the upper tiers, the bottom card of the upper tier and the top card of the lower tier being at a common altitude, a cabinet or shield to surround the carrier and having spaced windows at the said common altitude, and means so operable with regard to the carrier, the card tiers, and the cabinet, that there is the changing from one card to the other of each tier, at each of the windows.

In testimony whereof we affix our signatures.

FREDRICK C. KAISER.
FREDERICK H. KAISER.